United States Patent
Chen et al.

(10) Patent No.: US 8,872,464 B2
(45) Date of Patent: Oct. 28, 2014

(54) MOTOR CONTROL METHOD

(75) Inventors: Tung-An Chen, Kaohsiung (TW);
Chieh-Feng Lee, Kaohsiung (TW);
Deng-Shan Jian, Kaohsiung (TW);
Wen-Chieh Lin, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 558 days.

(21) Appl. No.: 13/245,626

(22) Filed: Sep. 26, 2011

(65) Prior Publication Data

US 2013/0027192 A1      Jan. 31, 2013

(30) Foreign Application Priority Data

Jul. 26, 2011   (TW) .............................. 100126428 A (51) Int. Cl.
*G05B 11/28*   (2006.01)
*H02P 23/00*   (2006.01)

(52) U.S. Cl.
CPC ........ *H02P 23/0068* (2013.01); *H02P 23/0072* (2013.01)
USPC ........... 318/599; 318/560; 318/811; 318/810; 318/807; 318/767

(58) Field of Classification Search
CPC .................................................. H02P 23/0072
USPC .......... 318/599, 560, 811, 810, 807, 767, 727
See application file for complete search history.

(56) References Cited

U.S. PATENT DOCUMENTS

| | | | |
|---|---|---|---|
| 4,794,312 A * | 12/1988 | Kano et al. | 318/599 |
| 5,705,907 A * | 1/1998 | Miyamori et al. | 318/599 |
| 6,626,002 B1 | 9/2003 | Notohara et al. | |
| 7,723,945 B2 * | 5/2010 | Okamura | 318/805 |
| 2006/0049705 A1 | 3/2006 | Matsubara et al. | |
| 2010/0043409 A1 | 2/2010 | Naydenov et al. | |

FOREIGN PATENT DOCUMENTS

| | | |
|---|---|---|
| CN | 2442301 Y | 8/2001 |
| TW | 578577 | 3/2004 |
| TW | 201001897 | 1/2010 |
| TW | 201122236 | 7/2011 |

* cited by examiner

*Primary Examiner* — David S Luo
(74) *Attorney, Agent, or Firm* — Muncy, Geissler, Olds & Lowe, P.C.

(57) ABSTRACT

A motor control method comprises: inputting a PWM signal into a control unit for the control unit to obtain a direction command and a speed command by an identification rule, and generating a control signal according to the direction and speed commands by the control unit; and generating a driving signal according to the control signal by the driving unit for driving a motor to operate according to the direction and speed commands.

26 Claims, 7 Drawing Sheets

MOTOR CONTROL METHOD

BACKGROUND OF THE INVENTION

1. Field of the Invention

The present invention generally relates to a motor control method and, more particularly, to a motor control method capable of controlling the rotational speed and rotational direction of a motor by a single signal.

2. Description of the Related Art

Conventionally, a fan wheel of a fan in an electric device is usually designed to be rotated in a predetermined direction by a motor of the fan for efficiently dissipating the heat generated during operation of the electric device. However, dust coming along with the airflow drawn into the electric device can be easily accumulated inside the electric device. Therefore, the motor usually drives the fan wheel to rotate in a reverse direction opposite to the predetermined direction for a while, such as 5 seconds, after the electric device is just started so as to execute a dust-removing process for the electric device, and then drives the fan wheel to rotate in the predetermined direction for cooling the electric device after the dust-removing process is finished.

Figure 1:
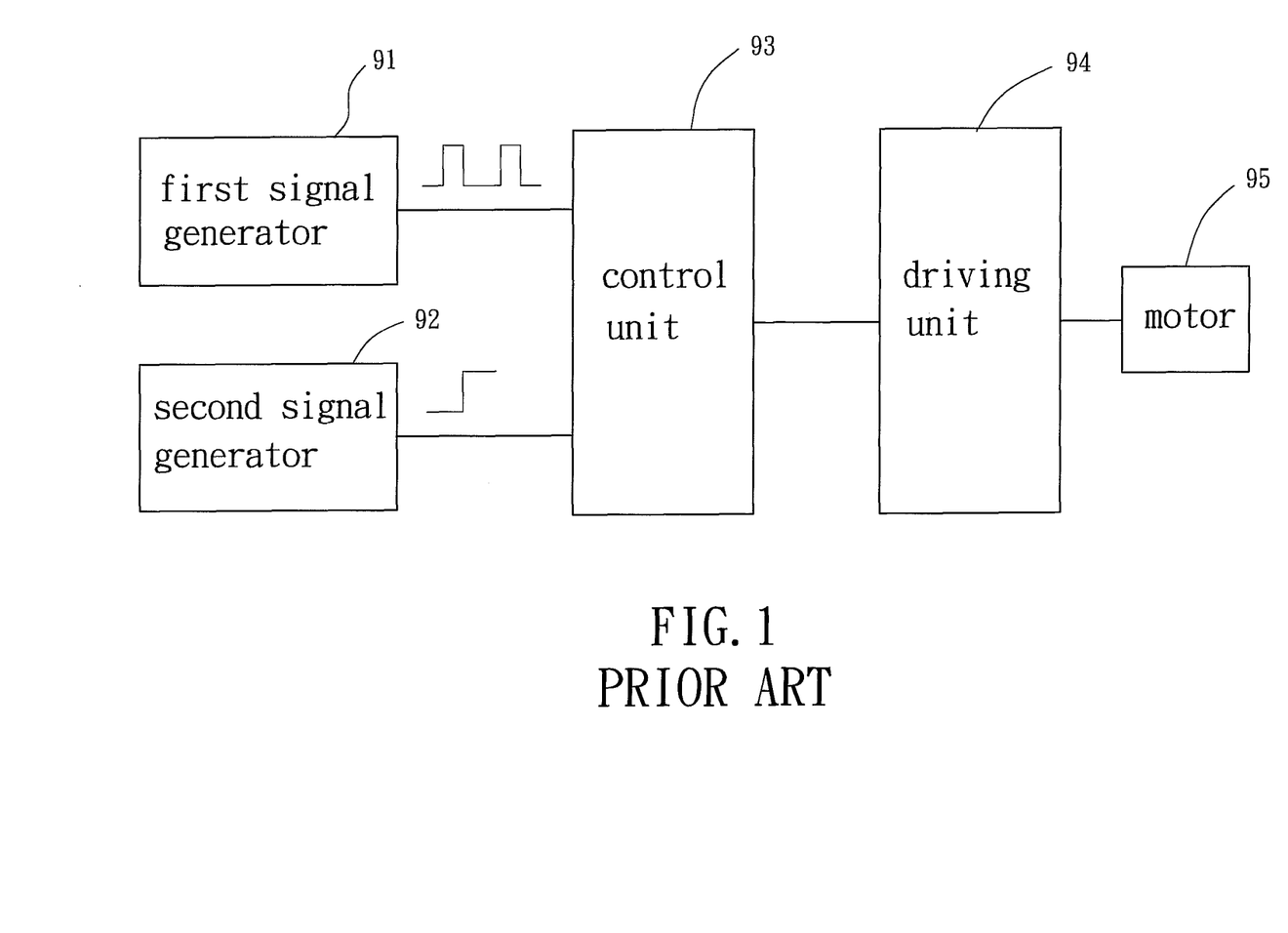
FIG. 1 shows a block diagram of a motor control system for implementing a conventional motor control method.

Referring to FIG. 1, a block diagram of a motor control system implementing a conventional motor control method is shown, wherein a first signal generator 91 and a second signal generator 92 electrically connect with a control unit 93, a driving unit 94 electrically connects with the control unit 93 and a motor 95, and the motor 95 connects to and rotates a fan wheel. In the motor control method, the first signal generator 91 generates a direction signal, which is preferably a logical signal such as a HIGH signal or a LOW signal, to include a direction command for operating a rotor of the motor 95 to rotate in a predetermined direction or a reverse direction opposite to the predetermined direction, and the second signal generator 92 generates a speed signal such as a PWM signal or a DC signal to include a speed command by the duty ratio of the PWM signal or the voltage level of the DC signal for controlling the speed of the rotor. The control unit 93 may produce a control signal according to the direction and speed commands, and the driving unit 94 will convert the control signal into a driving signal to drive the motor 95, so that the motor 95 can drive a fan wheel for heat dissipating or dust removing.

However, there are still some drawbacks of the conventional motor control method waiting to be overcome.

(A). The first and second signal generators 91, 92 have to respectively generate the direction and speed commands for driving the motor 95 in a desired direction with a desired speed. However, in some motor control systems that only generates a PWM signal, a circuit of this motor control system has to be modified for the additional direction control function since the PWM signal only includes the speed command. In other words, the conventional motor control method cannot be implemented by these motor control systems unless a circuit modification is done, and this will limit the use of the conventional motor control method apparently.

(B). It is known that the strength of a signal decays corresponding to a transmitted distance of the signal, and thus the transmission of the direction signal and the speed signal may result in a power consumption higher than that of a single signal including both the direction and speed commands.

(C). The motor 95 can normally operate only if both of the direction signal and the speed signal are safely received by the control unit 93. In other words, once any one of these two signals is missed or distorted, the control unit 93 will not be able to accurately generate the control signal for the driving unit 94 to drive the motor 95. Therefore, a possibility of incorrect operation of this conventional motor control method is higher than that of a motor control method using only a signal including both the direction and speed commands.

(D). Space and cost for the signal generator 91, 92 are larger than those for a single signal generator, while circuit complexity of the motor control system with the signal generator 91, 92 is higher than that of a motor control system only having one signal generator.

In light of this, it is desired to provide a motor control method that is capable of being implemented without circuit modification, lowers power consumption and fault possibility, and decreases required space, cost and circuit complexity of a motor control system implementing the motor control method, so as to save power and increase operation reliability.

SUMMARY OF THE INVENTION

It is therefore the primary objective of this invention to provide a motor control method, wherein a PWM signal can be used for both direction and speed controls without any hardware modification to a conventional motor control system, so as to provide a convenient implement, low power consumption, and low fault possibility, and to decrease required space, cost and circuit complexity of a motor control system.

The invention discloses a motor control method, which comprises: inputting a PWM signal into a control unit for the control unit to obtain a direction command and a speed command by an identification rule, and generating a control signal according to the direction and speed commands by the control unit; and generating a driving signal according to the control signal by the driving unit for driving a motor to operate according to the direction and speed commands.

The invention further discloses that the control unit obtains the direction command from a characteristic value of the PWM signal.

The invention further discloses that the said characteristic value of the PWM signal is duty ratio, frequency or amplitude thereof.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the term "first," "second," "third" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

Figure 2:
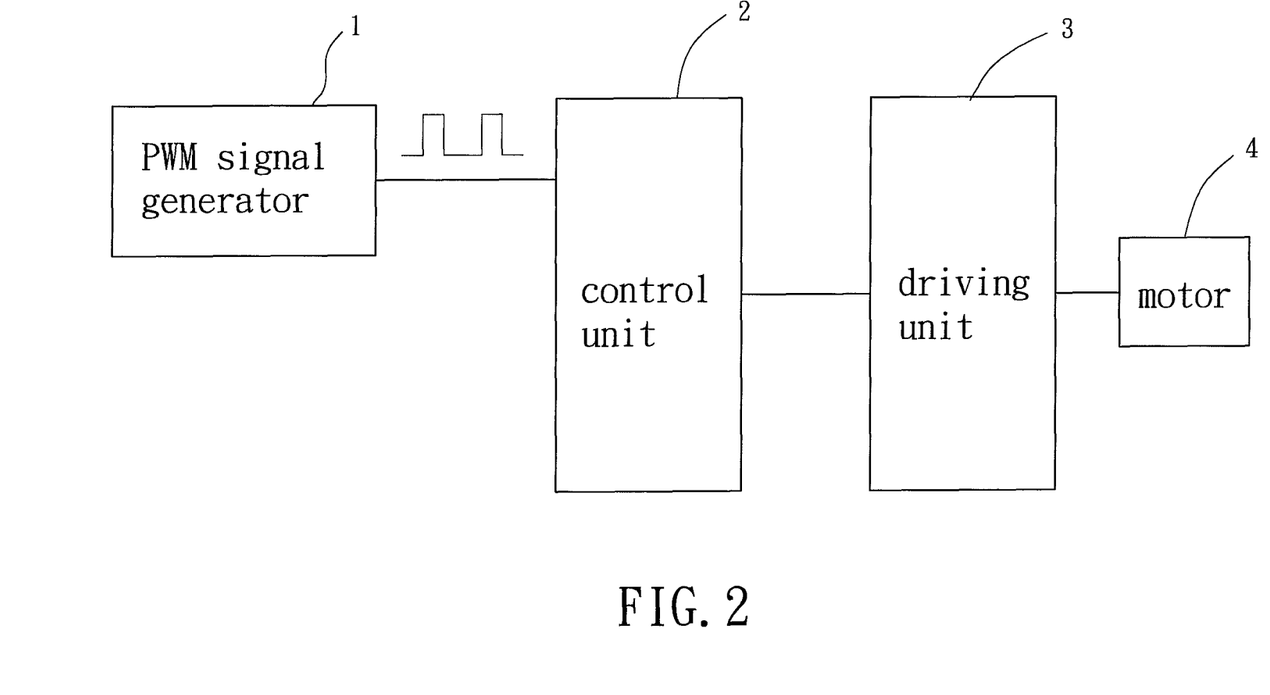
FIG. 2 shows a block diagram of a motor control system for implementing a motor control method according to a preferred embodiment of the invention.

Referring to FIG. 2, a system for implementing a motor control method of a preferable embodiment of the present invention is shown, which includes a PWM signal generator 1, a control unit 2, a driving unit 3 and a motor 4. The PWM signal generator 1 generates a PWM signal including a direction command and a speed command, wherein the direction command corresponds to a desired rotational direction of the motor 4 and the speed command corresponds to a desired rotational speed of the motor 4. The control unit 2 electrically connects with the PWM signal generator 1 for the PWM signal to be inputted into the control unit 2. Therefore, the control unit 2 can receive the direction and speed commands from the PWM signal and generate a control signal according to the received direction and speed commands. The driving unit 3 electrically connects with the control unit 2 and the motor 4, so that the control signal can be inputted into the driving unit 3 for the driving unit 3 to generate a driving signal by the control signal, and thus the driving unit 3 can drive the motor 4 by the driving signal that corresponds to the direction and speed commands. Specifically, the control unit 2 and driving unit 3 can be two separated electric devices/circuits or integrally formed as a single electric device/circuit. A fan wheel can be firmly mounted on a rotor of the motor 4, and thus the fan wheel may execute a cooling process or a dust-removing process for an object such as an electric device.

Specifically, the direction command and speed command can be represented by at least one characteristic value of the PWM signal such as duty ratio, frequency or amplitude. In this embodiment, the PWM signal generator 1 is a PWM signal generating circuit. The control unit 2 is capable of program execution and signal conversion such as a programmable controller or an ASIC to analyze the characteristic value of the PWM signal using a control program while allowing a user to modify the control program and parameters contained in the control program. The driving unit 3 may be a conventional motor driver to process the control signal such as amplifying for generating the driving signal to drive the motor 4, so that the motor 4 operates according to the direction and speed commands.

Figure 3:
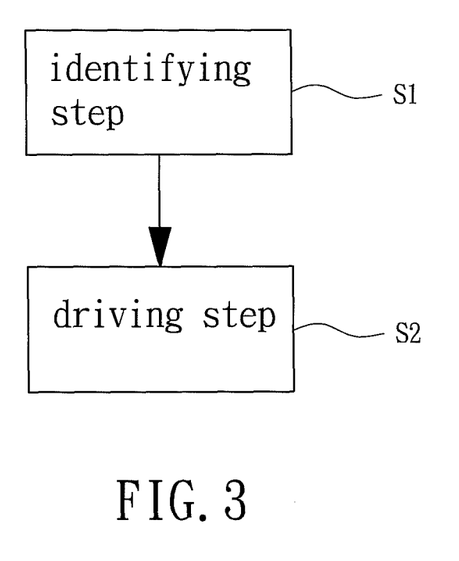
FIG. 3 shows a flow chart of the motor control method according to the preferred embodiment of the invention.

Referring to FIG. 3, the motor control method of the preferable embodiment of the present invention includes an identifying step S1 and a driving step S2. In the identifying step S1, the control unit 2 receives the PWM signal, which includes a plurality of control commands containing the direction command and the speed command, identifies the direction and speed commands in the PWM signal based on an identification rule, and then generates the control signal according to the direction and speed commands.

Figure 4:
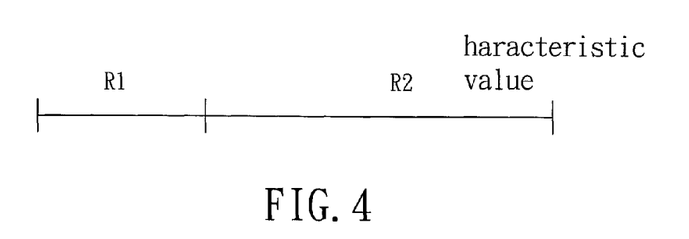
FIG. 4 shows a sketch diagram of the first and second direction regions of the preferred embodiment of the invention.

Specifically, please refer to FIG. 4. The range of a characteristic value of the PWM signal, which represents the direction command, is preferably divided into a first direction region "R1" and a second direction region "R2," so as to be respectively mapped to two opposite rotational directions of the motor 4. At this point, the characteristic value is preferably the duty ratio, frequency or amplitude of the PWM signal. In other words, the control unit 2 identifies whether the characteristic value of the PWM signal falls within the first direction region "R1" or the second direction region "R2," and determines that the direction command is going to drive the motor 4 operating in a first rotational direction when the characteristic value is in the first direction region "R1" and the direction command is going to drive the motor 4 operating in a second rotational direction when the characteristic value is in the second direction region "R2."

On the other hand, the control unit 2 identifies the speed command by the duty ratio of the PWM signal. Additionally, when the duty ratio of the PWM signal also includes the direction command and causes the range of the duty ratio to be divided into the first and second direction regions "R1," "R2," a speed range of the motor 4 between zero and a rated speed can be mapped to the first direction region "R1" to represent the speed of the motor 4 in the first rotational direction, and the speed range of the motor 4 can also be mapped to the second direction region "R2" to represent the speed of the motor 4 in the second rotational direction. However, when the duty ratio of the PWM signal only includes the speed command, the speed range of the motor 4 can be mapped to the full range of the duty ratio.

Now referring to FIG. 3 again, in the driving step S2, the driving unit 3 generates the driving signal by the control signal for operating the motor 4 according to the direction and speed commands. In detail, although the control signal corresponds to the direction and speed commands, the control signal is not in a preferable form for driving the motor 4. Therefore, the driving unit 3 has to process the control signal such as amplifying the control signal for obtaining the driving signal and directly send the driving signal to the motor 4. In the following illustration, three examples respectively including the direction command in the duty ratio, frequency and amplitude of the PWM signal are discussed. However, the way for the PWM signal to include the direction command is not limited thereby.

Figure 5A:
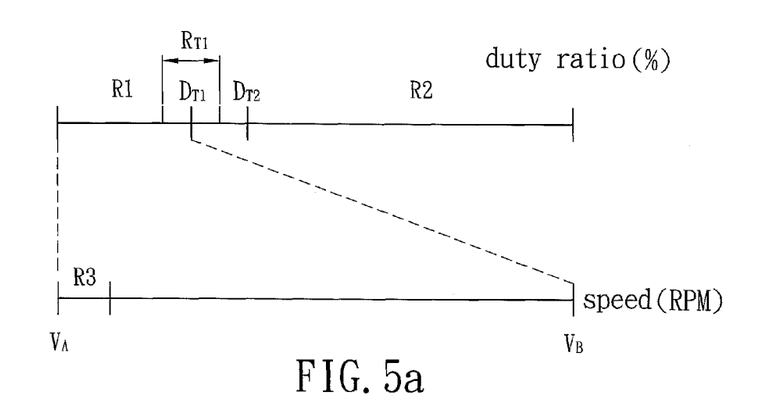
FIG. 5a shows a sketch diagram of a first example of the preferred embodiment of the invention, which illustrates the mapping between a duty ratio of a PWM signal and a speed of a motor in a first rotational direction.
Figure 5B:
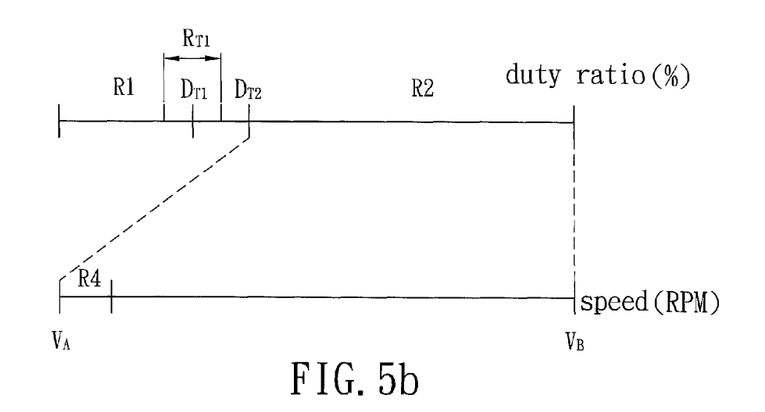
FIG. 5b shows a sketch diagram of the first example, which illustrates the mapping between the duty ratio and the speed in a second rotational direction.

A first example is illustrated in the following to show the detail of how the duty ratio of the PWM signal can include the direction and speed commands at the same time. Please refer to FIG. 5a showing the mapping between the duty ratio of the PWM signal and the speed of the motor 4 in the first rotational direction, and also refer to FIG. 5b showing the mapping between the duty ratio of the PWM signal and the speed of the motor 4 in the second rotational direction. A first threshold value "$D_{T1}$" and a second threshold value "$D_{T2}$" in duty ratio are previously defined to establish the first direction region "R1" as a region from 0% to the first threshold value "$D_{T1}$" and to establish the second direction region "R2" as a region from the second threshold value "$D_{T2}$" to 100%. The second threshold value "$D_{T2}$" is larger than the first threshold value "$D_{T1}$," and the first threshold value "$D_{T1}$" is preferably a value in a threshold range "$R_{T1}$."

In the identifying step S1, the control program of the control unit 2 determines whether the duty ratio of the PWM signal is smaller than the first threshold value "$D_{T1}$" while the threshold range "$R_{T1}$" is a range between 3% and 8% in duty ratio. If the duty ratio of the PWM signal is smaller than the first threshold value "$D_{T1}$," that is, in the first direction region "R1," the control unit 2 generates the control signal for the motor 4 to operate in the first rotational direction in a first speed, so that the fan wheel driven by the motor 4 may execute a dust-removing process. Specifically, the first speed can be fixed; however, the first speed can also be variable according to the duty ratio of the PWM signal, with the speed range of the motor 4 between a minimum speed "$V_A$" and a maximum speed "$V_B$" mapped to the first direction region "R1." In detail, when the duty ratio of the PWM signal is in the first direction region "R1" and the first speed is variable, the first speed is preferably obtained by the following equation:

$$V_1 = \frac{D_C}{D_{T1}} \cdot V_B, \tag{1}$$

wherein the "$V_1$" represents the first speed and the "$D_C$" represents the duty ratio of the PWM signal. Besides, there can be a power-off region "R3" between the minimum speed "$V_A$" and the maximum speed "$V_B$" for the control program of the control unit 2 to turn off the control signal and stop sending power to the motor 4 for power saving, and the power-off region "R3" is preferably defined as a region below 10% of the maximum speed "$V_B$."

On the other hand, when the duty ratio of the PWM signal is larger than the first threshold value "$D_{T1}$," the control program of the control unit 2 determines whether the duty ratio of the PWM signal is larger than the second threshold value "$D_{T2}$" preferably 10% in duty ratio. If the duty ratio of the PWM signal is larger than the second threshold value "$D_{T2}$," that is, in the second direction region "R2," the control unit 2 generates the control signal for the motor 4 to operate in the second rotational direction in a second speed, so that the fan wheel driven by the motor 4 may execute a cooling process. Similarly, the second speed can be fixed, or the second speed can be variable according to the duty ratio of the PWM signal, with the speed range of the motor 4 between the minimum speed "$V_A$" and the maximum speed "$V_B$" mapped to the second direction region "R2." In detail, when the duty ratio of the PWM signal is in the second direction region "R2" and the second speed is variable, the second speed is preferably obtained by the following equation:

$$V_2 = \frac{V_B}{(D_{max} - D_{T2})} \cdot (D_C - D_{T2}), \tag{2}$$

wherein the "$V_2$" represents the second speed and the "$D_{max}$" represents the maximum value of the duty ratio, which is usually 100%. Furthermore, there can also be a power-off region "R4" between the minimum speed "$V_A$" and the maximum speed "$V_B$" for the control program of the control unit 2 to stop sending power to the motor 4 for power saving, and the power-off region "R4" is preferably defined as a region below 10% of the maximum speed "$V_B$."

Please be noted that if the duty ratio of the PWM signal is larger than the first threshold value "$D_{T1}$" but smaller than or equal to the second threshold value "$D_{T2}$," the way that the control signal of the control unit 2 controls the motor 4 depends on the previous rotational direction of the motor 4. Specifically, in the above situation, the control unit 2 generates the control signal for the motor 4 to operate in the first rotational direction in the first speed if the duty ratio of the PWM signal was in the first direction region "R1" before falling within the region between the first and second threshold values "$D_{T1}$," "$D_{T2}$." However, if the duty ratio of the PWM signal was in the second direction region "R2" before falling within the region between the first and second threshold values "$D_{T1}$," "$D_{T2}$," the control signal generated by the control unit 2 controls the motor 4 to operate in the second rotational direction in the second speed.

Figure 6:
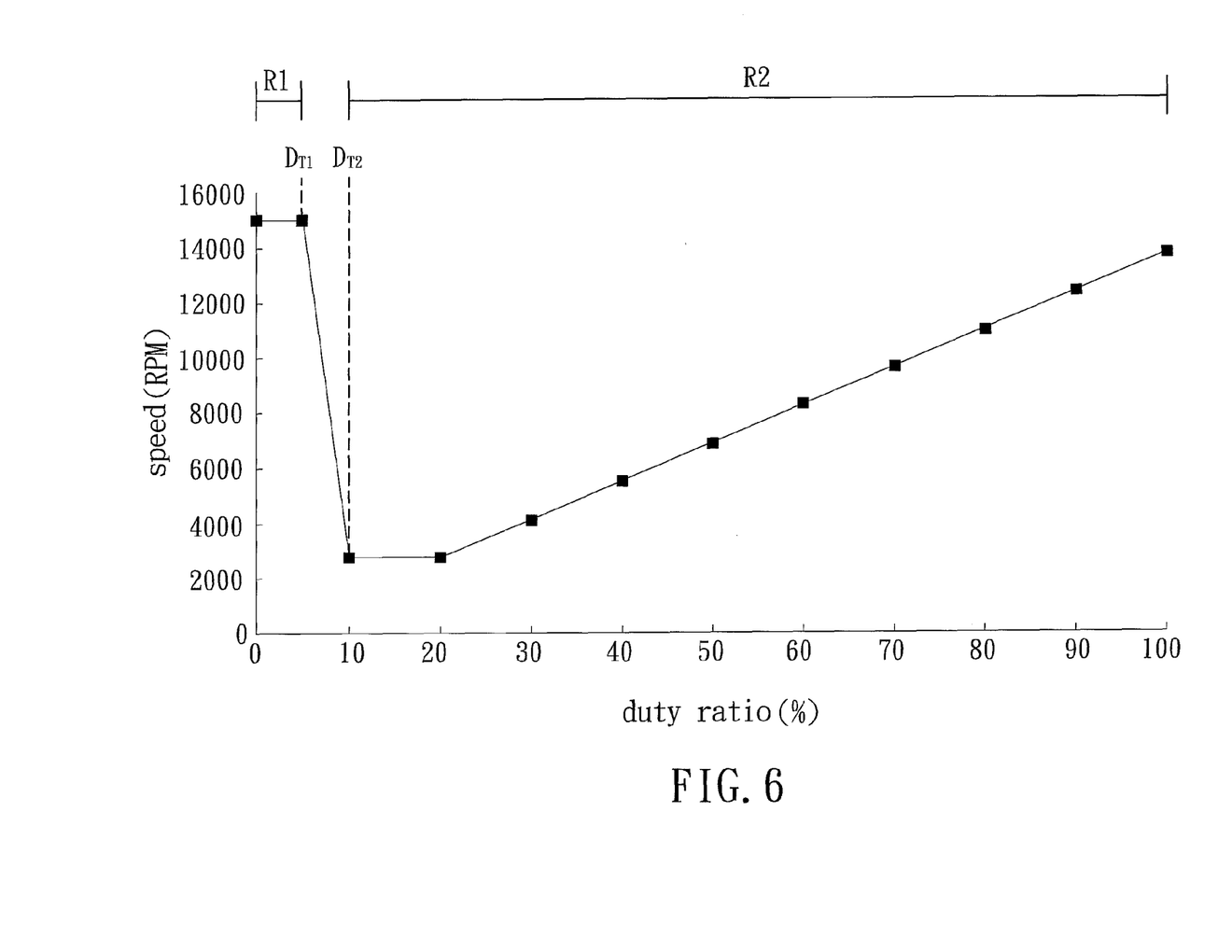
FIG. 6 shows a curve diagram of the first example, which illustrates a relationship between the duty ratio and the speed.

Please refer to FIG. 6, which is a curve showing a relationship between the duty ratio of the PWM signal and the speed of the motor 4. Please be noted that when the rotor of the motor 4 rotating in the first rotational direction is about to switch its rotational direction, namely, to rotate in the second rotational direction, it is preferable to turn off the control signal by the control unit 2 for a re-starting time period or until the speed of the motor 4 falls below a re-starting speed, so as to prevent the motor 4 from a high reversal current that damages or stops the motor 4. Similarly, the control unit 2 may operate in the same way when the rotational direction of the rotor of the motor 4 is going to be reversely changed from the second rotational direction to the first rotational direction.

In accordance with the above equations (1) and (2), the PWM signal used in the present motor control method can be generated in the following way by the PWM signal generator 1. Firstly, the PWM signal generator 1 determines whether the direction command going to be included in the PWM signal is for driving the motor 4 in the first rotational direction or not. If the direction command is for driving the motor 4 in the first rotational direction, the PWM signal generator 1 generates the PWM signal according to the speed command, that is, the first speed "$V_1$" by the following equation (3), with the duty ratio of the PWM signal set to be smaller than the first threshold value "$D_{T1}$:"

$$D_C = \frac{V_1}{V_B} \cdot D_{T1}. \tag{3}$$

On the contrary, if the direction command is not for driving the motor 4 in the first rotational direction, the PWM signal generator 1 identifies that the direction command is for driving the motor 4 in the second rotational direction and generates the PWM signal according to the speed command, that is, the second speed "$V_2$" by the following equation (4), with the duty ratio of the PWM signal set to be larger than the second threshold value "$D_{T2}$:"

$$D_C = \frac{(D_{max} - D_{T2}) \cdot V_2}{V_B} + D_{T2}. \tag{4}$$

A second example is illustrated in the following to show the detail of how the frequency of the PWM signal can include the direction command and the duty ratio of the PWM signal can include the speed command at the same time. Please be noted that the speed range of the motor 4 can be mapped to the full range of the duty ratio of the PWM signal since the duty ratio needs not include both of the direction and speed commands, and thus the speed resolution in speed control of the motor 4 is kept. Please refer to FIGS. 7a and 7b, which respectively show the mapping between the frequency of the PWM signal and the speed of the motor 4 in the first rotational direction and the mapping between the frequency of the PWM signal and the speed of the motor 4 in the second rotational direction.

Figure 7A:
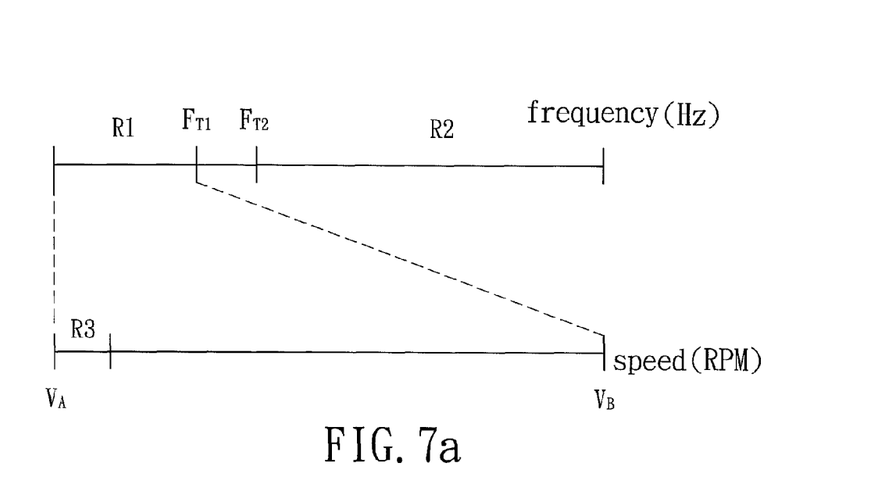
FIG. 7a shows a sketch diagram of a second example of the preferred embodiment of the invention, which illustrates the mapping between a frequency of the PWM signal and the speed in the first rotational direction.
Figure 7B:
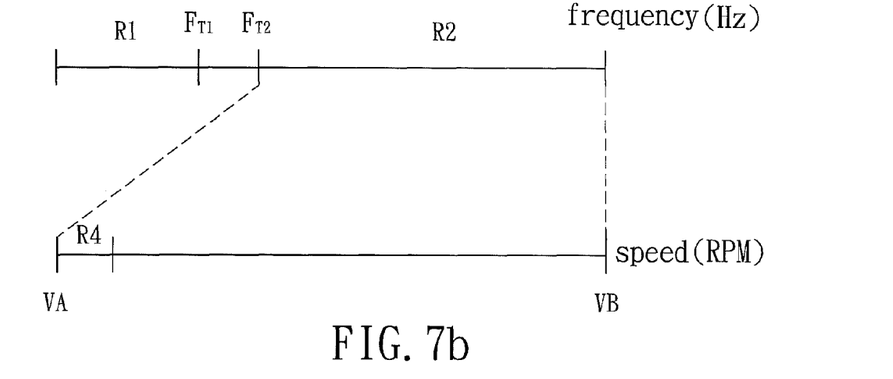
FIG. 7b shows a sketch diagram of the second example, which illustrates the mapping between the frequency and the speed in the second rotational direction.

Another first threshold value "$F_{T1}$" such as 100 Hz and another second threshold value "$F_{T2}$" such as 25 kHZ in frequency are previously defined to establish the first direction region "R1" as a region from a minimum frequency to the first threshold value "$F_{T1}$" and to establish the second direction region "R2" as a region from the second threshold value "$F_{T2}$" to a maximum frequency, with the second threshold value "$F_{T2}$" larger than the first threshold value "$F_{T1}$."

In the identifying step S1, the control program of the control unit 2 determines whether the frequency of the PWM signal is smaller than the first threshold value "$F_{T1}$." If the frequency of the PWM signal is smaller than the first threshold value "$F_{T1}$," that is, in the first direction region "R1," the control unit 2 generates the control signal for the motor 4 to operate in the first rotational direction in a third speed, so that the fan wheel driven by the motor 4 may execute a dust-removing process. On the other hand, when the frequency of the PWM signal is larger than the first threshold value "$F_{T1}$," the control program of the control unit 2 further determines whether the frequency of the PWM signal is larger than the second threshold value "$F_{T2}$." If the frequency of the PWM signal is larger than the second threshold value "$F_{T2}$," that is, in the second direction region "R2," the control unit 2 generates the control signal for the motor 4 to operate in the second rotational direction in the third speed, so that the fan wheel driven by the motor 4 may execute a cooling process. However, if the frequency of the PWM signal is larger than the first threshold value "$F_{T1}$" but smaller than or equal to the second threshold value "$F_{T2}$," the way that the control signal of the control unit 2 controls the motor 4 depends on the previous rotational direction of the motor 4, which is similar to the way illustrated in the first example.

Specifically, the third speed can be fixed; however, the third speed can also be variable according to the duty ratio of the PWM signal. In detail, when the third speed is variable, the third speed is preferably obtained by the following equation:

$$V_3 = V_B \cdot D_C \quad (5),$$

wherein the "$V_3$" represents the third speed, and the control program of the control unit 2 can also turn off the control signal and stop sending power to the motor 4 for power saving when the third speed "$V_3$" falls within the power-off region "R3."

In accordance with the above equation (5), the PWM signal used in the present motor control method can be generated in the following way by the PWM signal generator 1. Firstly, the PWM signal generator 1 determines whether the direction command going to be included in the PWM signal is for driving the motor 4 in the first rotational direction or not. If the direction command is for driving the motor 4 in the first rotational direction, the PWM signal generator 1 generates the PWM signal with a frequency smaller than the first threshold value "$F_{T1}$;" and the PWM signal generator 1 generates the PWM signal with the frequency larger than the second threshold value "$F_{T2}$" if the direction command is for driving the motor 4 in the second rotational direction. Besides, no matter which rotational direction the motor 4 rotates, the duty ratio of the PWM signal corresponds with the speed command, that is, the third speed "$V_3$" and can be shown by the following equation (6):

$$D_C = \frac{V_3}{V_B}. \quad (6)$$

A third example is illustrated in the following to show the detail of how the amplitude of the PWM signal can include the direction command and the duty ratio of the PWM signal can include the speed command at the same time. Please refer to FIGS. 8a and 8b, which respectively show the mapping between the amplitude of the PWM signal and the speed of the motor 4 in the first rotational direction and the mapping between the amplitude of the PWM signal and the speed of the motor 4 in the second rotational direction. Another first threshold value "$A_{T1}$" such as 3V and another second threshold value "$A_{T2}$" such as 5V in amplitude are previously defined to establish the first direction region "R1" as a region from a minimum amplitude to the first threshold value "$F_{T1}$" and to establish the second direction region "R2" as a region from the second threshold value "$F_{T2}$" to a maximum amplitude, with the second threshold value "$A_{T2}$" larger than the first threshold value "$A_{T1}$."

Figure 8A:
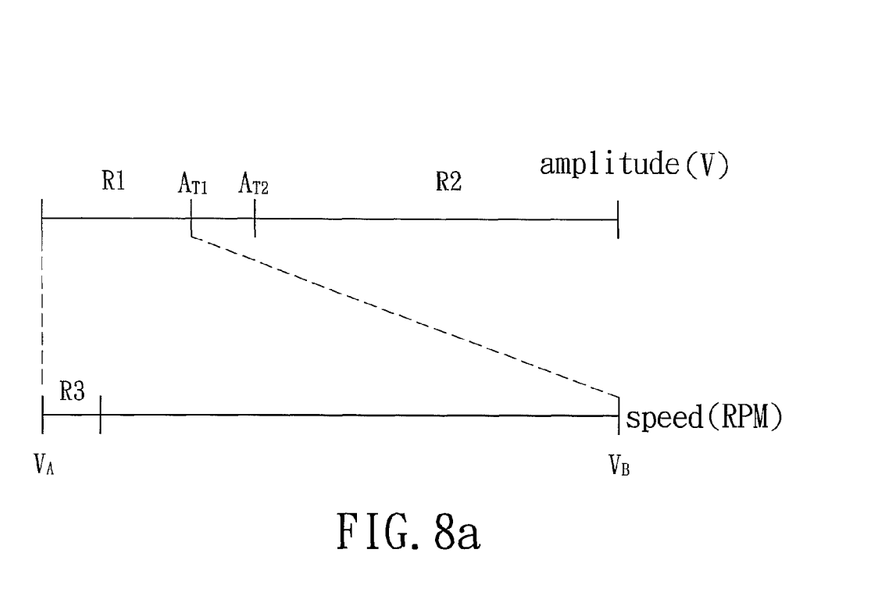
FIG. 8a shows a sketch diagram of a third example of the preferred embodiment of the invention, which illustrates the mapping between an amplitude of the PWM signal and the speed in the first rotational direction.
Figure 8B:
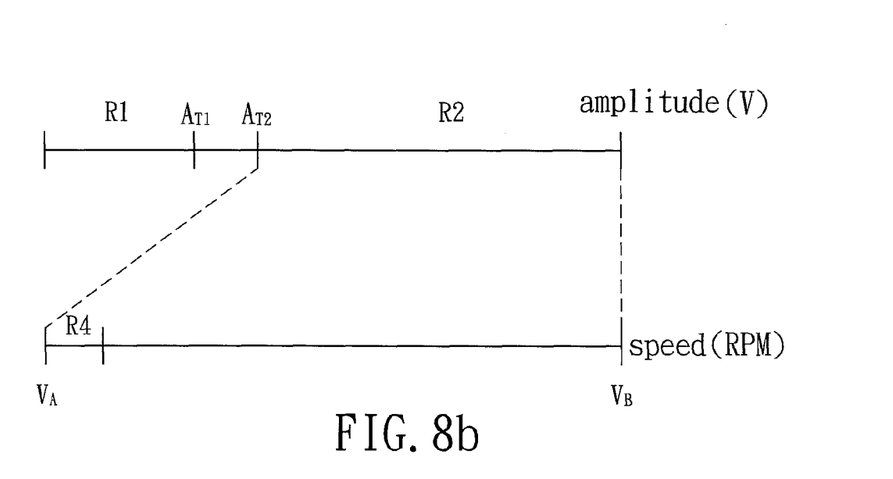
FIG. 8b shows a sketch diagram of the third example, which illustrates the mapping between the amplitude and the speed in the second rotational direction.

In the identifying step S1, the control program of the control unit 2 determines whether the amplitude of the PWM signal is smaller than the first threshold value "$A_{T1}$." If the amplitude of the PWM signal is smaller than the first threshold value "$A_{T1}$," that is, in the first direction region "R1," the control unit 2 generates the control signal for the motor 4 to operate in the first rotational direction with the third speed, so that the fan wheel driven by the motor 4 may execute a dust-removing process. On the other hand, when the amplitude of the PWM signal is larger than the first threshold value "$A_{T1}$," the control program of the control unit 2 further determines whether the amplitude of the PWM signal is larger than the second threshold value "$A_{T2}$." If the amplitude of the PWM signal is larger than the second threshold value "$F_{T2}$," that is, in the second direction region "R2," the control unit 2 generates the control signal for the motor 4 to operate in the second rotational direction in the third speed, so that the fan wheel driven by the motor 4 may execute a cooling process. However, if the amplitude of the PWM signal is larger than the first threshold value "$A_{T1}$" but smaller than or equal to the second threshold value "$A_{T2}$," the way that the control signal of the control unit 2 controls the motor 4 depends on the previous rotational direction of the motor 4, which is similar to the way illustrated in the first example.

Similarly to the second example, the PWM signal used in this example can be generated in the following way by the PWM signal generator 1. Firstly, the PWM signal generator 1 determines whether the direction command going to be included in the PWM signal is for driving the motor 4 in the first rotational direction or not. If the direction command is for driving the motor 4 in the first rotational direction, the PWM signal generator 1 generates the PWM signal with an amplitude smaller than the first threshold value "$A_{T1}$." Otherwise, if the direction command is for driving the motor 4 in the second rotational direction, the PWM signal generator 1 generates the PWM signal with the amplitude larger than the second threshold value "$A_{T2}$."

In sum, by identifying which one of two different regions the characteristic value of the PWM signal (such as the duty ratio, the frequency and the amplitude) falls within, the direction command is included in the PWM signal, and thus both of the direction and speed commands are transmitted by the PWM signal since the speed command is also included in the PWM signal by the duty ratio thereof. Therefore, only one signal for transmission of the direction and speed commands is needed, and the present motor control method can lower power consumption and fault possibility and decrease required space, costs and circuit complexity of the motor control system. Furthermore, since the direction command is included in the PWM signal, it is convenient for conventional motor control systems to be modified by merely changing the control program to implement the present motor control method.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A motor control method, comprising:
inputting a PWM signal into a control unit for the control unit to obtain a direction command and a speed command by an identification rule, and generating a control signal according to the obtained direction and speed commands by the control unit, wherein the control unit obtains the direction command from a characteristic value of the PWM signal, and
wherein a range of the characteristic value of the PWM signal is divided into a plurality of direction regions respectively mapping to a plurality of rotational directions of the motor; and
inputting the control signal into the driving unit for the driving unit to generate a driving signal according to the control signal and to drive a motor by the driving signal corresponding to the direction and speed commands.

2. The motor control method as claimed in claim 1, wherein the control unit drives the motor to operate in a first rotational direction when the characteristic value is in the first direction region, and the control unit drives the motor to operate in a second rotational direction when the characteristic value is in the second direction region.

3. The motor control method as claimed in claim 1, wherein the characteristic value of the PWM signal is duty ratio, frequency or amplitude of the PWM signal.

4. The motor control method as claimed in claim 1, wherein the control unit obtains the speed command from a duty ratio of the PWM signal.

5. The motor control method as claimed in claim 1, wherein a full range of duty ratio of the PWM signal includes a plurality of direction regions, with each direction region mapping to a speed range of the motor between a minimum speed and a maximum speed.

6. The motor control method as claimed in claim 1, wherein a full range of duty ratio of the PWM signal maps to a speed range of the motor between a minimum speed and a maximum speed.

7. The motor control method as claimed in claim 1, wherein the control unit sets a speed of the motor as a product of a ratio and a maximum speed of the motor, with the ratio is obtain by dividing a range of a direction region by a full range of duty ratio of the PWM signal.

8. The motor control method as claimed in claim 1, wherein the control unit sets a speed of the motor as a product of a duty ratio of the PWM signal and a maximum speed of the motor.

9. A motor control method, comprising:
inputting a PWM signal into a control unit for the control unit to obtain a direction command and a speed command by an identification rule, and generating a control signal according to the obtained direction and speed commands by the control unit,
wherein the control unit determines whether a duty ratio of the PWM signal is smaller than a first threshold value in duty ratio, and identifies the duty ratio as being in a first direction region to generate the control signal for the motor to operate in a first rotational direction in a first speed if the duty ratio of the PWM signal is smaller than the first threshold value, and
inputting the control signal into the driving unit for the driving unit to generate a driving signal according to the control signal and to drive a motor by driving signal corresponding to the direction and speed commands.

10. The motor control method as claimed in claim 9, wherein the first threshold value is within a threshold range.

11. The motor control method as claimed in claim 10, wherein the threshold range is a range between 3% and 8% in duty ratio of the PWM signal.

12. The motor control method as claimed in claim 9, wherein the first speed corresponds to a ratio obtained by dividing a range of a first direction region by a full range of duty ratio of the PWM signal.

13. The motor control method as claimed in claim 9, wherein the first speed is obtained by an equation of $$V_1 = \frac{D_C}{D_{T1}} \cdot V_B,$$

the "$V_1$" represents the first speed, the "$D_C$" represents the duty ratio of the PWM signal, the "$D_{T1}$" represents the first threshold value, and the "$V_B$" represents a maximum speed of the motor.

14. The motor control method as claimed in claim 9, wherein the control unit stops the motor when the first speed is in a power-off region.

15. The motor control method as claimed in claim 14, wherein the power off region is defined as a region below 10% of a maximum speed of the motor.

16. The motor control method as claimed in claim 9, wherein the control unit determines whether a duty ratio of the PWM signal is larger than a second threshold value in duty ratio, and identifies the duty ratio as being in a second direction region to generate the control signal for the motor to operate in a second rotational direction in a second speed if the duty ratio of the PWM signal is larger than the second threshold value.

17. The motor control method as claimed in claim 16, wherein the second speed corresponds to a ratio obtained by dividing a range of a second direction region by a full range of duty ratio of the PWM signal.

18. The motor control method as claimed in claim 16, wherein the second speed is obtained by an equation of $$V_2 = \frac{V_B}{(D_{max} - D_{T2})} \cdot (D_C - D_{T2}),$$

the "$V_2$" represents the second speed, the "$V_B$" represents a maximum speed of the motor, the "$D_{max}$" represents a maximum value of duty ratio of the PWM signal, the "$D_{T2}$" represents the second threshold value, and the "$D_C$" represents the duty ratio of the PWM signal.

19. The motor control method as claimed in claim 16, wherein the control unit stops the motor when the second speed is in a power-off region.

20. The motor control method as claimed in claim 19, wherein the power off region is defined as a region below 10% of a maximum speed of the motor.

21. A motor control method, comprising:
inputting a PWM signal into a control unit for the control unit to obtain a direction command and a speed command by an identification rule, and generating a control signal according to the obtained direction and speed commands by the control unit, wherein the control unit determines whether a frequency of the PWM signal is smaller than a first threshold value in frequency, and identifies the frequency as being in a first direction region to generate the control signal for the motor to operate in a first rotational direction if the frequency of the PWM signal is smaller than the first threshold value, and inputting the control signal into the driving unit for the driving unit to generate a driving signal according to the control signal and to drive a motor by the driving signal corresponding to the direction and speed commands.

22. The motor control method as claimed in claim 21, wherein the first threshold value is 100 Hz.

23. The motor control method as claimed in claim 21, wherein the control unit determines whether a frequency of the PWM signal is larger than a second threshold value in frequency, and identifies the frequency as being in a second direction region to generate the control signal for the motor to operate in a second rotational direction if the frequency of the PWM signal is larger than the second threshold value.

24. The motor control method as claimed in claim 23, wherein the second threshold value is 25 kHz.

25. A motor control method, comprising:

inputting a PWM signal into a control unit for the control unit to obtain a direction command and a speed command by an identification rule, and generating a control signal according to the obtained direction and speed commands by the control unit, wherein the control unit determines whether an amplitude of the PWM signal is smaller than a first threshold value in amplitude, and identifies the amplitude as being in a first direction region to generate the control signal for the motor to operate in a first rotational direction if the amplitude of the PWM signal is smaller than the first threshold value, and inputting the control signal into the driving unit for the driving unit to generate a driving signal according to the control signal and to drive a motor by the driving signal corresponding to the direction and speed commands.

26. The motor control method as claimed in claim 25, wherein the control unit determines whether an amplitude of the PWM signal is larger than a second threshold value in amplitude, and identifies the amplitude as being in a second direction region to generate the control signal for the motor to operate in a second rotational direction if the amplitude of the PWM signal is larger than the second threshold value.

* * * * *